(12) United States Patent
Kodialam et al.

(10) Patent No.: US 8,250,600 B2
(45) Date of Patent: Aug. 21, 2012

(54) ADVERTISEMENT SCHEDULING IN A PACKET-BASED MEDIA-DELIVERY SYSTEM

(75) Inventors: Muralidharan S. Kodialam, Marlboro, NJ (US); Tirunell V. Lakshman, Morganville, NJ (US); Sarit Mukherjee, Morganville, NJ (US)

(73) Assignee: Alcatel Lucent, Paris (FR)

( * ) Notice: Subject to any disclaimer, the term of this patent is extended or adjusted under 35 U.S.C. 154(b) by 690 days.

(21) Appl. No.: 12/415,392

(22) Filed: Mar. 31, 2009

(65) Prior Publication Data

US 2010/0251290 A1    Sep. 30, 2010

(51) Int. Cl.
*H04N 7/10* (2006.01)
(52) U.S. Cl. ............... 725/34; 725/32; 725/36
(58) Field of Classification Search ............ None
See application file for complete search history.

(56) References Cited

U.S. PATENT DOCUMENTS

| | | | | |
|---|---|---|---|---|
| 5,835,087 A * | 11/1998 | Herz et al. | ............ | 715/810 |
| 6,952,682 B1 * | 10/2005 | Wellman | ............ | 705/37 |
| 2002/0049843 A1 * | 4/2002 | Barone et al. | ............ | 709/225 |
| 2003/0115597 A1 * | 6/2003 | Yassin et al. | ............ | 725/36 |
| 2004/0044565 A1 * | 3/2004 | Kumar et al. | ............ | 705/14 |
| 2007/0011050 A1 | 1/2007 | Klopf et al. | | |
| 2007/0078717 A1 * | 4/2007 | Ho et al. | ............ | 705/14 |
| 2008/0052152 A1 * | 2/2008 | Yufik | ............ | 705/14 |
| 2008/0097838 A1 * | 4/2008 | Lin et al. | ............ | 705/14 |
| 2008/0127250 A1 * | 5/2008 | DaCosta | ............ | 725/34 |
| 2008/0243601 A1 | 10/2008 | Patel et al. | | |
| 2008/0306819 A1 | 12/2008 | Berkhin et al. | | |
| 2009/0217319 A1 * | 8/2009 | Weiss | ............ | 725/34 |

OTHER PUBLICATIONS

International Search Report and the Written Opinion of the International Searching Authority, or the Declaration, mailed Nov. 18, 2010, in International Application No. PCT/US2010/028106, Alcatel-Lucent USA Inc. Applicant, 8 pages.

* cited by examiner

*Primary Examiner* — Brian Pendleton
*Assistant Examiner* — Fernando Alcon
(74) *Attorney, Agent, or Firm* — Wall & Tong, LLP (57) ABSTRACT

In one embodiment, a scheme for the display of targeted and personalized advertisements in a packet-based media-delivery system, such as an Internet Protocol Television (IPTV) service. An Internet keyword-based advertisement-bidding model is used to place the most-appropriate IPTV advertisements for viewers depending on their interests as determined through the users' Internet activities, while maximizing advertising revenue for the IPTV service provider. One method for scheduling an advertisement for rendering in one or more time slots in packet-based media programming comprises: (a) obtaining at least one keyword from one or more Internet sessions corresponding to at least one user; (b) receiving a plurality of bid amounts corresponding to a plurality of available advertisements for the one or more time slots; and (c) scheduling, based on the at least one keyword and at least one of the bid amounts, the advertisement to be rendered to the at least one user in the one or more time slots.

26 Claims, 5 Drawing Sheets

ADVERTISEMENT SCHEDULING IN A PACKET-BASED MEDIA-DELIVERY SYSTEM

BACKGROUND OF THE INVENTION

1. Field of the Invention

The present invention relates generally to Internet Protocol Television (IPTV) and more particularly to schemes for the placement of advertisements in an IPTV system or another packet-based media-delivery system.

2. Description of the Related Art

IPTV is a term used to describe a number of service offerings for the delivery of packetized video services over a broadband network. Such video services can include multi-channel video services (switched digital video) that mimic traditional broadcast TV, true video-on-demand (VoD), and fully-interactive and/or enhanced video services. Typical service enhancements include, e.g., robust program information, selection, and navigation, as well as multiple camera angles, integrated digital video recording functionality, and the integration of data and telephony services into the video experience.

IPTV platforms include management software to stream television content through a number of broadcast channels to end users, as well as to stream on-demand video content from a VoD store to the end users through on-demand channels. The TV or video content that can be viewed can be accessed via an electronic program guide that further enables end users to select video programs to view and record.

In the realm of traditional television broadcasting, advertisements are selected for placement during a television program on a particular channel and at a particular time slot, and these advertisements may further be selected for placement based on other factors, including the geographic location of the viewer, the content of the television programs, and the ratings of the television programs. However, large groups of viewers inevitably all end up seeing the same advertisements, regardless of the individual viewer's personal preference or particular interests. In the realm of IPTV, it is desirable to customize advertisements to suit individual users' preferences, so that such advertisements can be targeted and personalized to enhance and optimize their effectiveness.

SUMMARY OF THE INVENTION

Embodiments of the present invention use a keyword-based advertisement-bidding model to place the most-appropriate advertisements for viewers while maximizing advertising revenue for the IPTV service provider.

In one embodiment of the invention, a method for scheduling an advertisement for rendering in one or more time slots in packet-based media programming includes the steps of: (a) obtaining at least one keyword from one or more Internet sessions corresponding to at least one user; (b) receiving a plurality of bid amounts corresponding to a plurality of available advertisements for the one or more time slots; and (c) scheduling, based on the at least one keyword and at least one of the bid amounts, the advertisement to be rendered to the at least one user in the one or more time slots.

In another embodiment of the invention, a system for scheduling an advertisement for rendering in one or more time slots in packet-based media programming includes (i) a computer connected to the Internet and (ii) a processor. The processor is adapted to: (a) obtain at least one keyword from one or more Internet sessions on the computer corresponding to at least one user; (b) receive a plurality of bid amounts corresponding to a plurality of available advertisements for the one or more time slots; and (c) schedule, based on the at least one keyword and at least one of the bid amounts, the advertisement to be rendered to the at least one user in the one or more time slots.

DETAILED DESCRIPTION

Display of targeted and personalized advertisements in an IPTV service involves either real-time or prior selection of different advertisements for different viewers based on their interests. The challenge is how to track each viewer's preferences, so that the most-relevant advertisements can be shown to the viewer in real time.

In one method of targeting advertisements to IPTV viewers, a viewer profile is generated for each individual viewer. This profile can be generated, e.g., based on the historical TV-viewing habits of the viewer. In this scenario, historical data for a given viewing session might include information including, e.g., identification of the TV programs the viewer watches, the times and days of those TV programs, and the viewer's interaction within the viewing session (e.g., whether the viewer watched certain advertisements or switched to a different channel, whether the viewer watched the TV program to its completion, etc.). The viewer's profile is augmented with the historical viewing-session data for each viewing session as such information becomes available. Advertisements are inserted based on the profile and historical session context data (e.g., time of day).

However, a profile constructed solely out of TV-viewing habits of a viewer does not necessarily reflect the viewer's true interests. This is due to the fact that the TV viewing is restricted to the TV programs available during a given time, and the viewer is not free to choose any program on any topic of his or her choice.

A viewer-provided demographic survey may alternatively or additionally be used to augment a viewer profile. However, viewer-provided demographic surveys are often difficult to obtain, tend to be broad, and cannot easily be updated as the viewer's interests change over time.

Instead, a viewer's interests may better be understood by observing the way the viewer uses the Internet, because browsing the Internet permits a viewer to choose to view any information, at any time, from among an enormous compendium of information covering essentially all subjects and available essentially all of the time. The most-common practice in Internet navigation is to use a search engine, e.g., Google (http://www.google.com) or Yahoo (http://www.yahoo.com), to find information available about a given topic of interest. The viewer inputs relevant keywords about the topic, and the search engine then returns a list of web sites that may relate to the topic. By keeping track of a viewer's Internet search pattern using the keywords that he or she provides as input to a search engine, and later mining the keywords, an indication about the viewer's interests can be obtained in real time.

Accordingly, embodiments of the present invention provide a solution for augmenting a viewer's profile in real time by tracking his or her Internet usage. For example, if a viewer is searching for cars on the Internet, then showing the viewer an automobile-related advertisement shortly thereafter would prove to be relevant. Methods consistent with embodiments of the invention involve the collection of keywords that a viewer inputs while searching the Internet. These keywords, augmented with the viewer's historical TV-viewing habits, generate a more-accurate viewer profile, which can be used to target advertisements for IPTV service. Moreover, by tracking the search keywords in real time, advertisements can be placed for the viewer that match the viewer's recent interests, making the advertisements more relevant and effective.

Various methods may be used by an IPTV service provider to collect, in real time, search keywords that a viewer inputs to the Internet. Selection of a keyword collection method can depend on one or more factors including, e.g., the number and/or type of service providers the viewer uses for IPTV service, the number and/or type of service providers the viewer uses for Internet service, and tp; the operational details of one or more Internet search engines used by the viewer.

Figure 1:
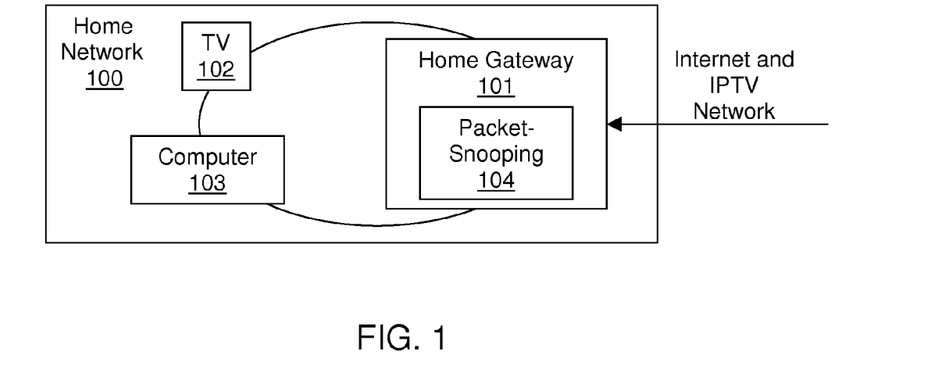
FIG. 1 is a block diagram of an exemplary home network, where IPTV and Internet services are provided by the same service provider.

A first exemplary method for keyword collection will now be described with reference to FIG. 1, which shows a block diagram of an exemplary home network 100, where the IPTV and Internet services are provided by the same service provider via a combination Internet/IPTV network. Home network 100 includes a television (TV) 102, a computer 103, and a home gateway 101, through which the IPTV and Internet services both enter home network 100. Home gateway 101 routes packets of IPTV traffic from the Internet/IPTV network to TV 102 and routes packets of Internet traffic bidirectionally between the Internet/IPTV network and computer 103.

Home gateway 101 contains a packet-snooping module 104, which inspects all web traffic that is destined for one or more search engines (e.g., Google or Yahoo). Packet-snooping module 104 could be configured to inspect traffic destined for any search engine, or alternatively, traffic destined for one or more particular search engines, which are identified by packet-snooping module 104, e.g., by IP address.

A Layer-4 switch can identify certain types of application traffic, e.g., hypertext transport protocol (HTTP) or e-mail, but cannot sort traffic by the application or user that created it. However, by using a Layer-7 switch at packet-snooping module 104, forwarding decisions can be made using specific application-layer criteria. A Layer-7 switch desirably performs wire-speed processing of packet-header content, not only at Layer 2 or Layer 3, but also at the transport layer (Layer 4) up through the application layer (Layer 7). A Layer-7 switch integrates routing and switching by forwarding traffic at Layer-2 speed using Layer-7 information. Using a Layer-7 switch permits further inspection of the packets belonging to a specific class of traffic, e.g., traffic through transport-control protocol (TCP) destination port 80, so that the keywords provided as input to a search engine by the viewer can be obtained.

Such functionality can be added to an existing intrusion detection system (e.g., the intrusion detection system known as "snort"), if such a system is already installed on home gateway 101. In this scenario, rules are added in snort that examine port 80 traffic destined for search engines and extract the keywords from the payload.

In real time, these keywords are fed into a software module maintained by the service provider, which builds the viewer's profile, as will be discussed in further detail below. This information can then be used to find the advertisement that is most relevant for the viewer at that time. If the service provider is not able or willing to provide a packet-snooping function in the home gateway, then the same functionality could alternatively be implemented in one of the upstream network nodes (e.g., a router) in the provider's network, assuming that the viewer-generated Internet traffic will always pass through that node.

It is noted that the first method of keyword collection does not need any prior arrangement or agreement between the service provider and the search engine provider, although this method might not work if the search engine provider uses a secure session (e.g., secure-socket layer (SSL)) instead of TCP to receive search keywords from users, such that packet-snooping would not be possible. If the search vendor uses a secure session for inputting search items, or if the IPTV and Internet service providers are different, then the traffic flows for IPTV and Internet searching will follow different paths.

Figure 2:
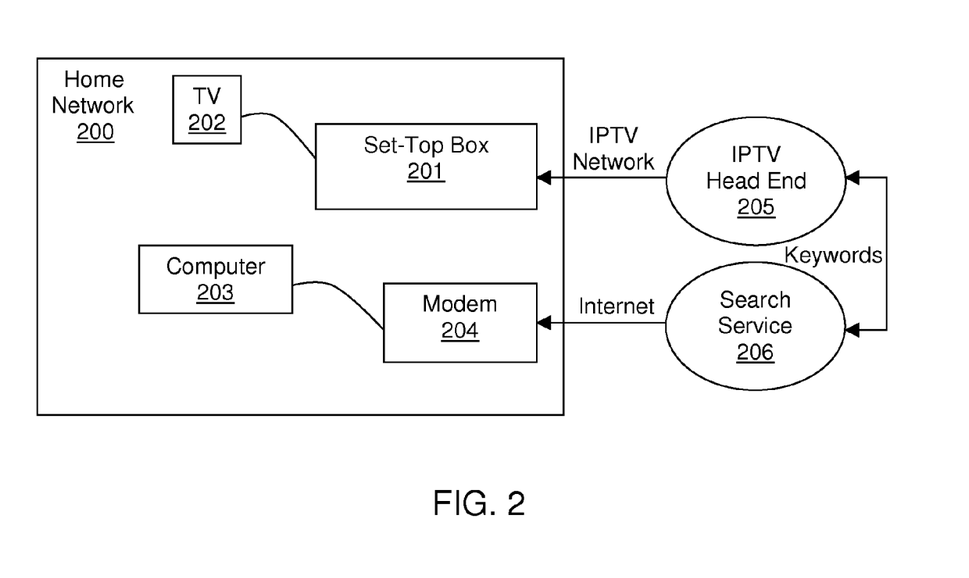
FIG. 2 is a block diagram of an exemplary home network, where IPTV and Internet services are provided by different service providers.

A second exemplary method for keyword collection will now be described with reference to FIG. 2, which shows a block diagram of an exemplary home network 200, where the IPTV and Internet services are provided by different service providers and therefore follow different paths. Home network 200 includes a set-top box (STB) 201, which provides IPTV service to TV 202, and a modem 204, which provides Internet service to computer 203. STB 201 communicates via an IPTV network by exchanging packets with IPTV head end 205, and modem 204 communicates via the Internet by exchanging packets with a search service 206 (e.g., Google or Yahoo), through which Internet searches are performed. In this arrangement, the IPTV service provider has some agreement with the operator of search service 206 to obtain search keywords of IPTV subscribers for use in creating viewers' profiles. As shown, the keywords are provided by search service 206 via a network (e.g., the Internet) to IPTV head end 205.

It should be understood that the collection of keywords may take place for keywords entered into not only traditional search engines (e.g., Google and Yahoo), but also online shopping sites (e.g., Amazon and ebay), travel booking sites (e.g., Expedia and Travelocity), and other types of web sites in which a user provides keywords as input. Accordingly, the term "search engine," as used herein, should be construed broadly to include any web site from which keywords can be collected and not limited to traditional search engines, e.g., Google and Yahoo.

Alternatively or additionally, keywords may be extracted from text, metatags, or other data appearing in the content of web sites visited by a user, even where the user does not perform any searching or input any of his or her own keywords. For example, if the user is viewing a web site about dogs, the keyword "dog" could be extracted from a hypertext-markup language (HTML) page of the site, e.g., where the word "dog" appears in the title (or other field) of the page or appears on the page with a high frequency. It is contemplated that other methods of keyword collection not specifically described herein are also feasible.

Collecting Internet search keywords for use in targeting IPTV advertisements permits the real-time construction and updating of viewer profiles using search keywords, so that a viewer's current interests can be captured and acted on quickly, thereby permitting targeted advertisements that are more relevant to the viewer's interests. No active participation is needed on the part of the viewer, and the viewer's profile can be constructed and updated in real time, while the viewer browses the Internet.

The use of keywords for targeted advertising has traditionally been limited to advertisements displayed during a search engine session, where advertisers bid on different keywords and pay money to the search engine provider for each impression (i.e., for each instance of a user clicking on an advertisement belonging to the advertiser), and the search engine selects advertisements for display adjacent to search results in a way that attempts to maximize the overall revenue of the search engine provider. There are, however, major differences between search engine and IPTV advertising schemes, including the following.

Search-engine advertisers compete for essentially unlimited space on a web browser display window, while IPTV advertisers compete for a limited duration of time on the TV screen of a viewer.

Search engines display targeted advertisements upon completion of a viewer's entry of search keywords, while IPTV can insert advertisements only during defined advertisement epochs, such that different advertisements will contend for a limited number of time slots.

Search engines display advertisements when a user inquires about topics, and therefore, it is sufficient for bidding to take place based solely on keywords relating to those topics, whereas, with IPTV, bidding for advertisements can be based not only on the keyword, but also on the timeliness of the display of the advertisement. In other words, the closer to the keyword search time the advertisement is shown, the better it is for the advertiser, because the advertisement is more likely to be relevant and timely with respect to the viewer's interests. Also, with IPTV, it is possible to target advertisements to a viewer or to a group of viewers in real time, since IPTV makes it possible to determine, in real time, whether a particular TV set is tuned to a particular channel.

While search engines can use the viewer's past searches to better target an advertisement, IPTV service can select advertisements even more appropriately based on the viewer's historical viewing habits as may be observed, e.g., by analyzing Internet Group Management Protocol (IGMP) logs.

While search engines can target advertisements only to individual users, IPTV service permits creating advertisements targeted to groups of viewers. This is possible by taking into consideration current channel information for a plurality of viewers, as well as network resource availability, since dynamic advertisement insertion in an IPTV environment employs additional processing and networking resources.

Due to the foregoing differences, known solutions in the domain of search engine advertisement placement are not applicable to scheduling advertisements for placement within IPTV programs.

Accordingly, embodiments of the present invention provide advertisement selection and scheduling algorithms for IPTV services that consider bidding from advertisers for the placement of advertisements using different keywords, for each advertisement time slot, and for each viewer.

In one embodiment, keywords are collected from viewers, e.g., using one of the methods described above. Advertisers are given the available time slots for advertisement placement, i.e., the TV programs during which a given advertisement could be shown to a viewer. The IPTV service provider provides advertisers with a list of popular keywords from which to choose and/or advertisers generate and supply their own keywords. Based on this information, for each advertisement, an advertiser bids on each viewer, at every time slot, for a specific keyword. The bid submission process may take place online (e.g., via an Internet website) or offline, and may take place in real time or ahead of time.

An advertisement selection and scheduling algorithm desirably partitions the viewers into distinct subsets and shows an advertisement for each subset, so as to maximize revenue from the advertisement. If there are no constraints on the number of different advertisements that can be shown at a given time slot (i.e., each viewer can be shown a different advertisement at the same time slot), then full personalization can be achieved. In practice, however, due to computing and networking resource constraints, it might be possible that only a few distinct advertisements can be shown at a given time slot, in which case only partial personalization can be achieved, where the maximum number of different advertisements is less than the total number of viewers. Algorithms for both full and partial personalization will be described in further detail below.

Figure 3:
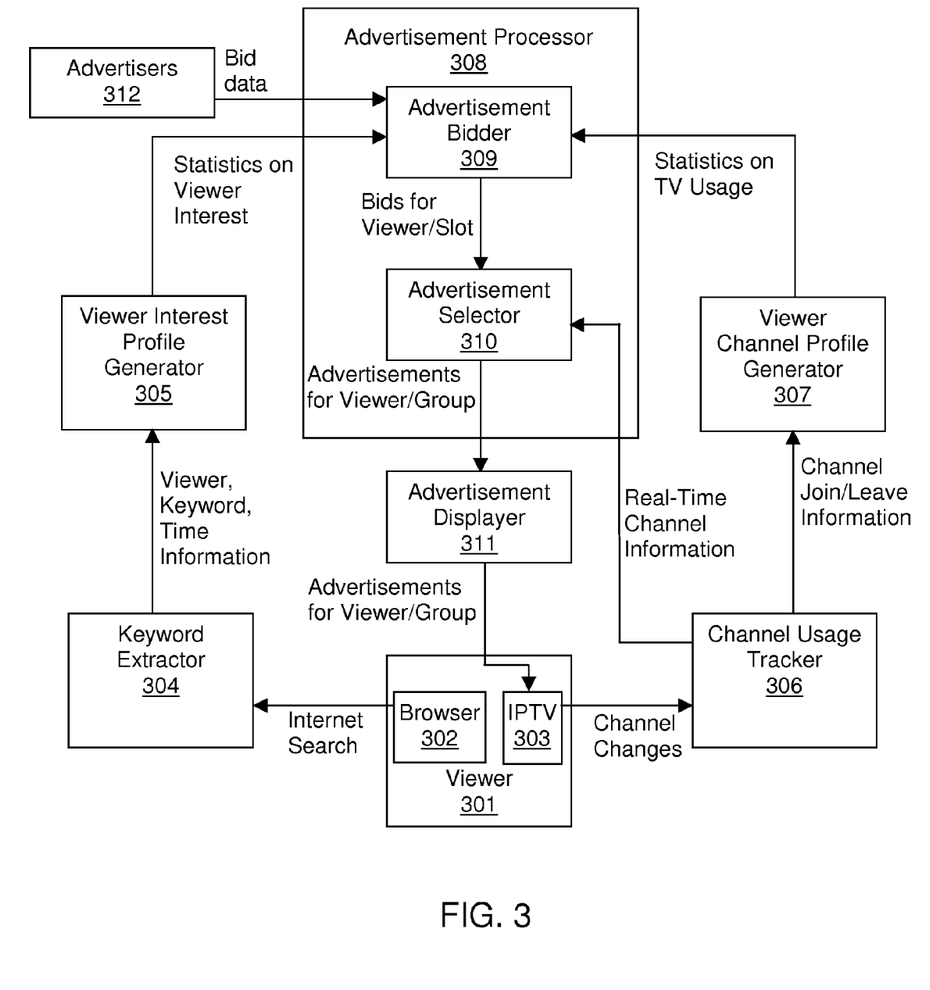
FIG. 3 is a block diagram of an exemplary framework for profile creation and targeted advertisement insertion in IPTV services.

FIG. 3 shows a block diagram of an exemplary framework that can be used for profile creation and targeted advertisement insertion in IPTV services. As shown, the framework includes the home network of a viewer 301 who performs searching on an Internet search engine via a web browser 302 and watches television on an IPTV system 303.

In FIG. 3, all of the elements appearing as external to viewer 301 are associated with or part of either the IPTV network or an Internet search service and might or might not physically reside within the viewer's home network. The architecture of either FIG. 1 or FIG. 2, or an alternative architecture, might be used in connection with the embodiment of FIG. 3.

Although FIG. 3 shows only one viewer 301, it should be understood that the framework of FIG. 3 can support analogous simultaneous processing for any number of viewers.

As viewer 301 types in search keywords to the Internet search engine, keyword extractor 304 examines the outgoing network packets and gleans the search keywords using, e.g., one of the methods described above with respect to FIGS. 1 and 2.

Keyword extractor 304 provides the extracted search keywords to a viewer interest profile generator 305, which maintains a profile for the viewer. Keyword extractor 304 may also provide additional information to viewer interest profile generator 305 including, e.g., the identity of viewer 301 and the time of day and/or date on which the keywords were extracted.

As viewer 301 watches television and changes the channels, information regarding which channels the viewer watched and the times at which the viewer watched those channels is collected by a channel usage tracker 306. This information may be provided to channel usage tracker 306, e.g., in the form of IGMP logs containing time-stamped join and leave messages.

The channel join/leave information is used by a viewer profile generator 307 (i) to determine whether a viewer's TV is on (i.e., to track short-term usage) and (ii) to create a viewer model for predicting which channel the viewer is going to watch at what time (i.e., to track long-term usage).

Viewer interest profile generator 305 provides viewer profile data to advertisement processor 308, and viewer channel profile generator 307 provides channel profile data to advertisement processor 308, which, in this exemplary embodiment, includes an advertisement bidder 309 and an advertisement selector 310.

For each advertisement, advertisers 312 place bids (in advance) on a plurality of viewers, at a plurality of time slots, for one or more specific keywords. For purposes of the embodiments of the invention described herein, every time slot and all advertisements are assumed to have the same length, although it is contemplated that, in other embodiments, advertisements and time slots of different lengths are possible. It should be understood that certain breaks in programming might accommodate multiple advertisements and might therefore contain multiple time slots for scheduling those advertisements.

Advertisement bidder 309 receives (i) the viewer profile data from viewer interest profile generator 305, (ii) the channel profile data from viewer channel profile generator 307, and (iii) bid data from advertisers 312. Advertisement bidder 309 constructs and places bids for viewers and time slots for different advertisements based on the keywords, which bids are provided to advertisement selector 310. A bid is placed for a given advertisement only if that advertisement has at least one keyword that matches or otherwise corresponds to a keyword extracted from the viewer's Internet session.

From these bids, advertisement selector 310 uses an algorithm to select the advertisement for each time slot that will generate the most revenue for the IPTV service provider and provides the identity of the selected advertisement to an advertisement displayer 311. Advertisement selector 310 may also receive from channel usage tracker 306 information in real time about the channels being watched by each individual viewer, which information is used to place advertisements in real time for a viewer or a group of viewers.

Using a technique known in the art (e.g., advertisement splicing, switching to a multicast advertisement channel, etc.), advertisement displayer 311 renders the advertisement identified for selection by advertisement selector 310 for display to the viewer via IPTV system 303, or for display to a group of viewers via their respective IPTV systems.

Two schemes that can be implemented by advertisement selector 310 for maximizing the revenue for the IPTV service provider from targeted advertisement placement will now be discussed. The first scheme is for full personalization, where the maximum number of combinations of advertisements and channels is dictated by the number of channels, such that each viewer can be shown a different advertisement in the same time slot. The second scheme is for partial personalization, where the maximum number of combinations of advertisements and channels is dictated by the total number of advertisements that system limitations permit to be shown during a given time slot, such that viewers are partitioned into groups, and viewers within each group are shown the same advertisement in the same time slot, while viewers in other groups are shown different advertisements during that time slot.

Full personalization can be relatively processing-intensive, because each advertisement is spliced into the main television program stream. Full personalization can be achieved, e.g., by splicing advertisements using either a viewer's set-top box or an upstream digital subscriber line access multiplexer (DSLAM) that has sufficient resources to perform advertisement splicing. If there are no restrictions on the number of viewers that can receive different simultaneous advertisements during a given time slot, then advertisements can be personalized for each individual viewer.

Figure 4:
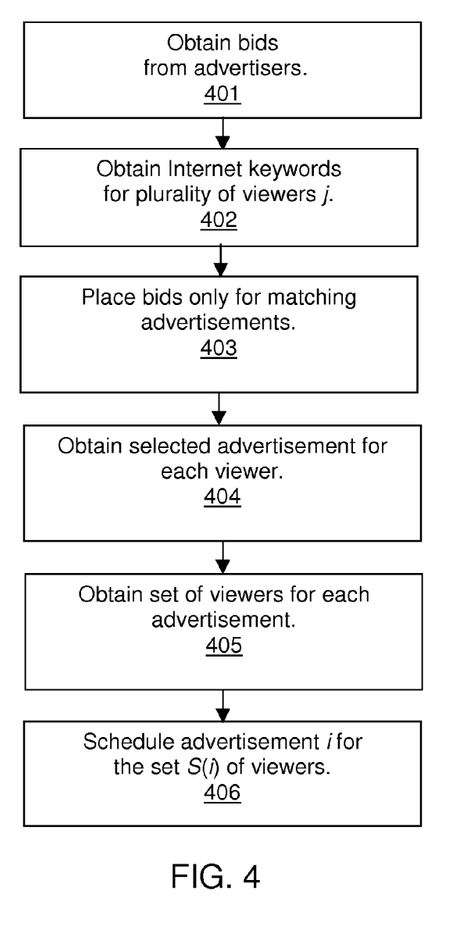
FIG. 4 is a flowchart of an exemplary full-personalization algorithm, consistent with one embodiment of the invention.

Full personalization may be achieved using an algorithm such as the exemplary algorithm of FIG. 4, which schedules advertisements to maximize the IPTV service provider's revenue. It is assumed that there are m advertisements, with i representing an advertisement, j representing a viewer, and $v_{ij}$ representing the monetary bid that an advertiser places on a given viewer j for a given advertisement i.

First, at step 401, bids are obtained from advertisers, as described above. Then, at step 402, search keywords are obtained for a plurality of viewers j using, e.g., one of the methods described above with respect to FIGS. 1 and 2. Next, at step 403, bids are placed only for matching advertisements, and the remaining advertisements are ignored. Then, at step 404, a selected advertisement a(j) is obtained for each viewer j by the equation $$a(j) = \arg\max_{1 \le i \le m} v_{ij}.$$

This equation returns the value of i that maximizes $v_{ij}$, thereby identifying and selecting the advertisement having the highest monetary value. Next, at step 405, a set S(i) of viewers is obtained for each advertisement i by the equation S(i)={j:a(j)=i}, which set includes all viewers j for whom advertisement i is the selected advertisement a(j). Finally, at step 406, advertisement i is scheduled for the set S(i) of viewers.

Figure 5:
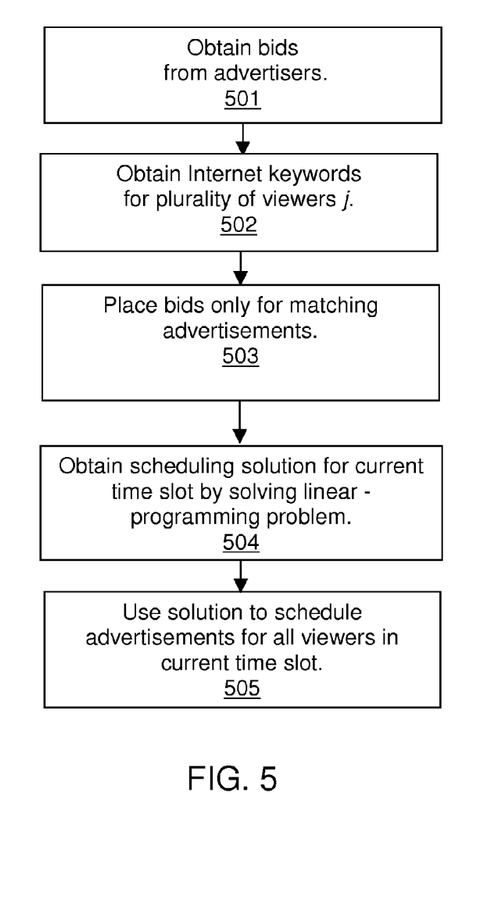
FIG. 5 is a flowchart of a first exemplary partial-personalization algorithm, consistent with one embodiment of the invention.

Partial personalization may be achieved using an algorithm such as the exemplary algorithm of FIG. 5, which schedules advertisements to maximize the IPTV service provider's revenue. It is assumed that there are m advertisements and n viewers in the system, with i representing an advertisement, j representing a viewer, and $v_{ij}$ representing the monetary bid that an advertiser places on a given viewer j for a given advertisement i.

It is also assumed that there are C television channels for which scheduling is to be performed, with c(j) representing the channel currently being watched by viewer j. In this embodiment, it is further assumed that, when a given time slot for placement of an advertisement occurs on one channel, that same time slot occurs concurrently on all other channels, such that advertisements are shown on all channels at the same time, and likewise, when those time slots are not occurring, non-advertising program content is shown on all channels at the same time. Alternatively, in this embodiment, it could be assumed that programs being shown concurrently on different channels have the same number of time slots, even if these time slots do not necessarily occur at the same times during the programs themselves, while these programs are being shown to viewers.

In a partial-personalization scheme, scheduling is restricted so that a maximum number K of advertisements can be shown during a given time slot over all C channels. In this scenario, an advertisement is shown on one or more of the C channels, and the algorithm will end up selecting no more than K advertisements for each time slot. For example, if there are twenty channels in the system (channels A through T), and, during a given time slot, system limitations permit only three different advertisements to be shown concurrently across these twenty channels (e.g., a first advertisement is shown to the group of users watching channels A and S, a second advertisement is shown to the group of users watching channels B-P and T, and a third advertisement is shown to the group of users watching channels Q and R), then K=3.

The exemplary algorithm of FIG. 5 selects the set of advertisements to show across all of the channels and assigns viewers to the different advertisements. Two binary decision variables are employed: $y_{ig}$, which has a value of one if advertisement i is shown on a given channel g and a value of 0 otherwise; and $x_{ij}$, which has a value of one if advertisement i is shown to viewer j and a value of 0 otherwise.

First, at step 501, bids are obtained from advertisers, as described above. Then, at step 502, search keywords are obtained for a plurality of viewers j using, e.g., one of the methods described above with respect to FIGS. 1 and 2. Next, at step 503, bids are placed only for matching advertisements, and the remaining advertisements are ignored. Then, at step 504, the following integer-programming problem is used to determine the optimal scheduling solution for the current time slot, where advertisement index i, viewer index j, and channel index g are used as indexing variables:

$$\max \sum_{i=1}^{m} \sum_{j=1}^{n} v_{ij} x_{ij},$$

subject to:

$$\sum_{i=1}^{m} x_{ij} = 1, \quad (1)$$

$$x_{ij} \leq y_{ic(j)}, \quad (2)$$

$$\sum_{i=1}^{m} \sum_{g=1}^{C} y_{ig} \leq K, \quad (3)$$

$$x_{ij} \in \{0, 1\}, \quad (4)$$

$$y_{ig} \in \{0, 1\}. \quad (5)$$

This integer-programming problem maximizes advertising revenue across all advertisements i and all viewers j subject to the following constraints. Constraint (1) specifies that some advertisement must be shown to viewer j during the time slot. Constraint (2) specifies that advertisement i must be shown to viewer j on the channel c(j) currently being watched by viewer j. Constraint (3) specifies that the total number of combinations of advertisements and time slots (i.e., the total number of unique advertisements shown during a given time slot) does not exceed the maximum number K of advertisements for any time slot. Constraints (4) and (5) specify that decision variables $x_{ij}$ and $y_{ig}$ are binary. Finally, at step 505, the scheduling solution obtained from the integer-programming problem is used to schedule advertisements for viewers in the current time slot.

Instead of scheduling using the integer-programming problem described above, less computationally-intensive combinatorial algorithms with guaranteed performance could alternatively be used to perform partial-personalization scheduling. An exemplary greedy combinatorial algorithm, which approximates the solution to the above integer-programming problem, is shown in the flow diagram of FIG. 6. This algorithm, which could be used instead of step 504 of FIG. 5, selects the combinations of advertisements and time slots that provide the maximum value at each iteration of the algorithm, for a total number of K iterations. To track the assignments made by the greedy algorithm, two m-vectors $\delta$ and u are maintained, where $\delta_j$ represents the advertisement assigned to viewer j, and $u_j$ represents the value (in terms of revenue) of this assignment.

Figure 6:
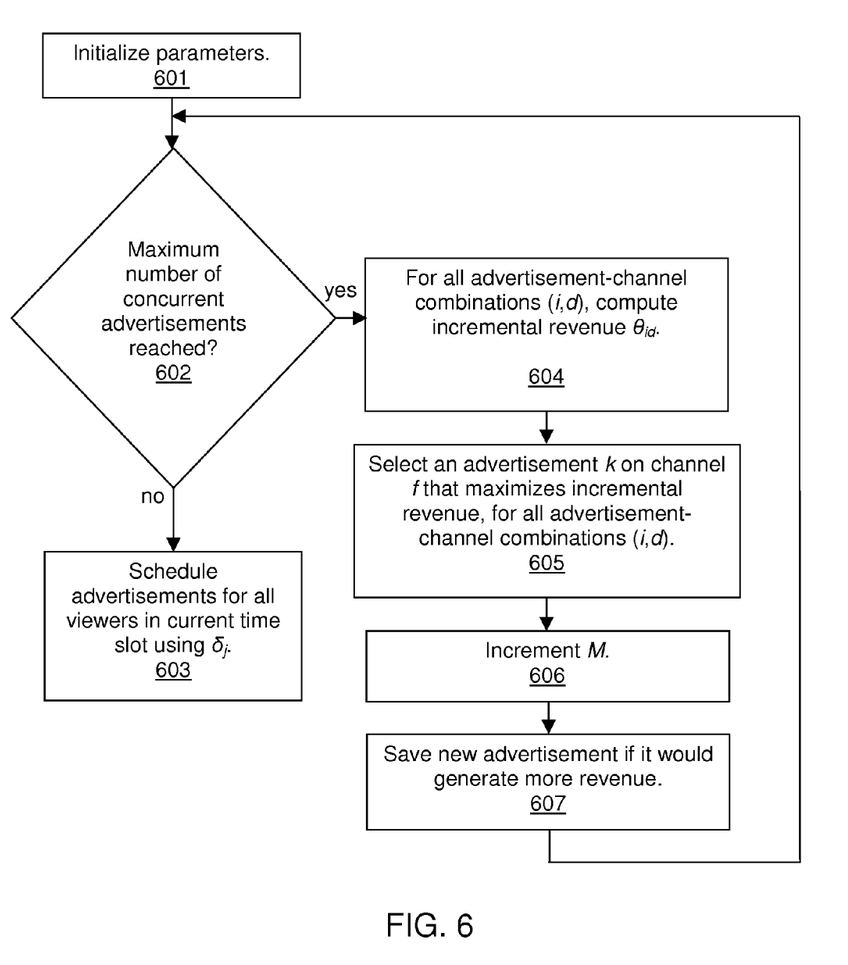
FIG. 6 is a flowchart of a second exemplary partial-personalization algorithm, consistent with one embodiment of the invention.

The algorithm begins at step 601, wherein the total number M of combinations of advertisements and time slots is set to 0, and $u_j$ is set to 0 for all viewers j. At step 602, a determination is made whether M<K, in which case the algorithm proceeds to step 604. If, at step 602, it is determined that M≧K, then the algorithm proceeds to step 603. At step 604, for all possible combinations (i,d) of advertisements and time slots, the incremental revenue $\theta_{id}$ obtained by scheduling a given advertisement i in time slot d is computed using $$\theta_{id} = \sum_{j:c(j)=d} \max\{v_{ij} - u_j, 0\}.$$

Incremental revenue $\theta_{id}$ represents the amount of revenue from scheduling advertisement i in time slot d in excess of the amount of revenue from the currently-scheduled advertisement in the time slot. Next, at step 605, an advertisement k is selected on channel f, such that $\theta_{kf}$ exceeds $\theta_{id}$ for all combinations (i,d) of advertisements and time slots, i.e., the advertisement having the maximum incremental revenue $\theta_{id}$ from among all possible advertisements is selected. Then, at step 606, the value of M is incremented by one. Next, at step 607, for each viewer j, if viewer j is watching channel f (i.e., c(j)=f), and if the revenue $v_{kj}$ obtained by showing advertisement k to viewer j is greater than the revenue $u_j$ of the advertisement currently assigned to viewer j (i.e., $v_{kj} > u_j$), then $u_j$ is assigned the value of revenue $v_{kj}$, and $\delta_j$ is assigned the value of advertisement k, which saves new advertisement k if it would generate more revenue. Step 607 assigns to each viewer j the advertisement that provides the maximum revenue from among all of the advertisements that have been selected so far (i.e., by setting $u_j$ to the value of $v_{kj}$). The algorithm then returns to step 602. At step 603, advertisements are scheduled for all viewers j in the current time slot using the values of $\delta_j$.

The foregoing algorithms may be used to schedule IPTV advertisements in real time based on a viewer's Internet search keywords. However, the viewer might not be browsing the Internet and watching television at the same time. In this scenario, certain embodiments of the invention might store Internet browsing information (e.g., keywords) to use in the future for a time slot in an IPTV viewing session.

Other embodiments of the invention handle this scenario by providing an IPTV advertisement-scheduling system that "looks ahead" to place advertisements in a plurality of defined future time slots, ahead of time. To solve the look-ahead scheduling problem in one such embodiment of the invention, keywords are collected from viewers, e.g., using one of the methods described above. Advertisers are given a look-ahead time horizon, i.e., a fixed period of time in the future containing multiple time slots for advertisement placement, i.e., the TV programs during which a given advertisement could be shown to a viewer. The IPTV service provider provides advertisers with a list of popular keywords from which to choose and/or advertisers generate and supply their own keywords. Based on this information, for each advertisement, an advertiser bids on each viewer, at every time slot of the horizon, for a specific keyword. The bid submission process may take place online (e.g., via an Internet website) or offline, and may take place in real time or ahead of time.

The bidding can take several forms. For example, the same advertisement can be displayed to the same viewer multiple times, generating the same revenue each time, or it might be possible that only the first display of the advertisement generates revenue, while subsequent displays of the same advertisement generate less or no revenue.

It is noted that there is no way of knowing whether or not a viewer's television will be on during a look-ahead time slot. Even if the television is on, there is still no way to know whether a viewer will actually be watching television during that time slot. To account for this unknown information, a viewer's statistical television-watching habits may be observed, e.g., by analyzing IGMP logs from different days.

Figure 7:
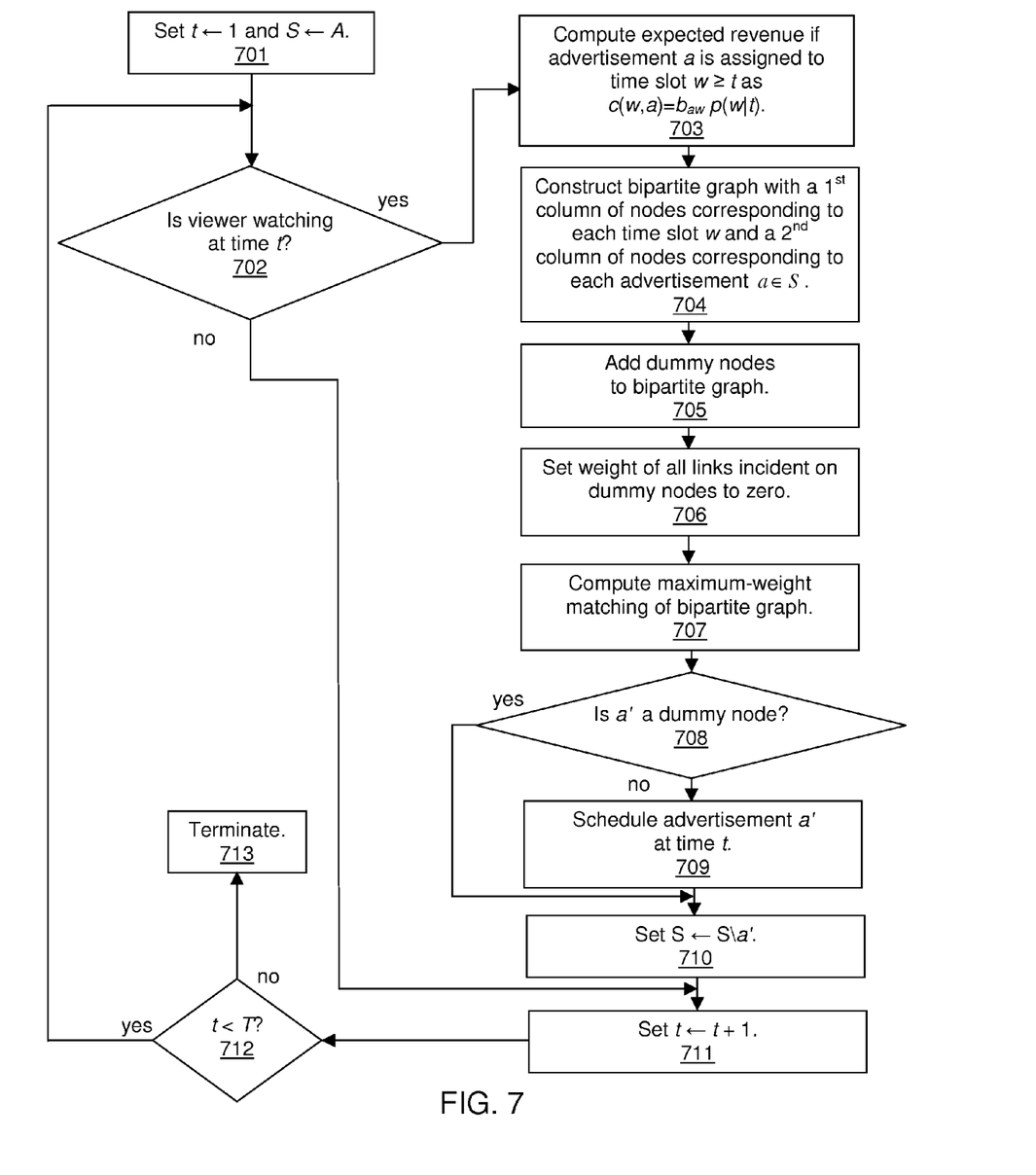
FIG. 7 is a flowchart of an exemplary look-ahead scheduling algorithm, consistent with one embodiment of the invention.

Look-ahead advertisement selection and scheduling may be achieved using an algorithm such as the exemplary dynamic-programming algorithm of FIG. 7, which selects, for a single channel, an advertisement for each time slot in the horizon, for each viewer, to maximize the IPTV service provider's expected revenue. To avoid the state-space explosion problem (which arises where a system comprising concurrent components has a number of states so large as to be unmanageable, due to the multiplication of the numbers of states of the concurrent components), a one-step look-ahead procedure is employed, with a lower bound on expected revenue. The problem then reduces to solving a maximum-matching problem on a bipartite graph having two columns of nodes. The variable A represents the set of all advertisements, with $b_{at}$ representing the bid that an advertiser places for an advertisement a∈A for a given time slot t in a time horizon having a plurality T of time slots for which schedules are being computed. The variable S represents the set of eligible advertisements to be placed, where an eligible advertisement is one that has not yet been scheduled to be shown to any viewer in any time slot.

Although the algorithm is referred to herein as a "lookahead" algorithm, the algorithm is actually executed at the very beginning of each time slot, to constantly recompute the best advertisement schedule for that time slot and subsequent time slots in the horizon, based on (i) whether a viewer is watching during that time slot and (ii) the viewer's past viewing habits.

First, at step 701, the algorithm starts with the first time slot by setting the value of t as 1 and the value of S as A. Next, at step 702, a determination is made, at the beginning of time slot t, whether the viewer is currently watching, in which case the method proceeds to step 703 to schedule an advertisement to be shown in time slot t. If it is determined at step 702 that the viewer is not watching at the beginning of time slot t, then no advertisement will be scheduled during time slot t, and the algorithm proceeds to step 711.

At step 703, the expected revenue c(w,a) if advertisement a is assigned to time slot w≧t is computed as $c(w,a)=b_{aw}p(w|t)$, where p(t|t)=1, and $b_{aw}$ represents the bid for advertisement a in time slot w. The expression p(w|t) represents the probability that the viewer is viewing in time slot w, given that the viewer was viewing in a time slot t occurring at some point prior to time slot w (i.e., t<w), and this probability can be calculated, e.g., using information extracted from IGMP logs.

Next, at step 704, a complete bipartite graph is constructed, where the graph includes: a first column of nodes corresponding to each time slot w, where t≦w≦T (i.e., w is a generic time slot somewhere between t and T), and a second column of nodes corresponding to each advertisement a∈S. The "weight" of the link connecting time slot w to advertisement a is c(w,a). Then, at step 705, dummy nodes are added to ensure an equal number of nodes on both sides of the bipartite graph.

Next, at step 706, the weight of all links incident on dummy nodes is set to zero. Then, at step 707, maximum-weight matching is computed in the bipartite graph, whereby an advertisement a'∈S is matched with a node corresponding to each time slot t so as to maximize the total sum of the weights of all links. Exemplary maximum-weight matching algorithms are described, e.g., at pages 600-604 of Cormen et al., *Introduction to Algorithms* ($3^{rd}$ ed. 1991), incorporated by reference herein in its entirety.

Next, at step 708, a determination is made whether a' is a dummy node, in which case no advertisement is scheduled at time t, and the algorithm proceeds to step 710. If, at step 708, it is determined that a' is not a dummy node, then the algorithm proceeds to step 709. At step 709, advertisement a' is scheduled at time t. Next, at step 710, advertisement a' is removed from the set S of eligible advertisements, i.e., S←S\a'. Then, at step 711, the next time slot is selected, i.e., t=t+1. Next, at step 712, a determination is made whether t<T, in which case the algorithm returns to step 702. If, at step 712, it is determined that t≧T, then the scheduling is complete, and the algorithm terminates at step 713.

While the foregoing algorithm of FIG. 7 performs scheduling for only a single channel, it is contemplated that embodiments of the invention include the use of multi-channel "look-ahead" scheduling algorithms.

Although embodiments of the invention are described herein in the context of only a single individual performing both Internet searching and watching IPTV in a given household, it is likely that more than one individual will share an Internet connection and IPTV services within the same household. One way of handling this scenario would be to treat all of the individuals as a single viewer, such that only a single set of keywords is collected, irrespective of the individual performing the Internet searching, and all IPTV advertisements that are scheduled are based on those keywords, irrespective of the individual who actually views those advertisements. Alternatively, along with the Internet search keywords, additional criteria may be received that can be used to identify which individual is performing a search, e.g., a username used to log into a search engine, an IP address of a particular computer on the home network, etc. Similar criteria can be used to identify which individual is viewing IPTV, e.g., an IP address (or other identification) of a set-top box of a particular television on the home network, or examination of past viewing habits to determine which individual is most likely watching IPTV based on the current channel being watched, the time/date television is being watched, the type or content of the program being watched, etc.

It should be understood that appropriate hardware, software, or a combination of both hardware and software is provided to effect the processing described above, in the various embodiments of the present invention. It should further be recognized that a particular embodiment of the present invention may support one or more of the modes of operation described herein, but not necessarily all of these modes of operation.

Although the advertisements described herein are video advertisements in an IPTV system containing broadcast programming, on-demand programming, and/or recorded (e.g., digital-video recorder) programming, the invention may also have utility in placing advertisements in other media, e.g., audio advertisements in an IP radio system, video advertisements in an on-demand video system, video advertisements in an Internet- or web-delivered video system, or audio or video advertisements in a cellular telephony-based on-demand and/or streaming media system. The term "programming" should be broadly construed to include all of the foregoing. The term "media," as used herein, should therefore be understood to include audio-only content, video-only content, and content containing both audio and video.

The terms "viewer" and "user" may be used interchangeably herein and are defined to include a person who conducts an Internet session, e.g., a web browsing session or a search engine session, as well as a person who received packet-based media content by watching IPTV, listening to IP radio, etc. The singular terms "viewer" and "user" are also used herein to refer collectively to a group of individuals, such as members of a family living in one household, in which case a scheme consistent with embodiments of the invention might not be able to determine which of these individuals is watching IPTV or conducting an Internet session, and therefore, all possible individuals are treated as a single viewer, e.g., for purposes of keyword collection and/or advertisement placement, without regard to which or how many of these individuals are actually performing these activities.

The expression "match," as used herein in connection with comparing keywords from advertisement bids and keywords from a viewer's Internet session to place a bid for an advertisement during a time slot, should be construed broadly to refer not only to exact, character-for-character keyword matches, but also to fuzzy-logic matches, i.e., matches made based on the most-probable word or phrase match when no character-for-character keyword match exists. Matching, in the context of the present invention, should also be construed to include non-exact keyword matching and matching based on any other criteria and algorithms, e.g., using synonym-based, related-term-based or concept-based keyword matching.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method for scheduling an advertisement for rendering in one or more time slots in packet-based media programming, the method comprising the steps of:
   (a) obtaining, by a processor at least one keyword from one or more Internet sessions corresponding to at least one user;
   (b) receiving, by the processor a plurality of bid amounts corresponding to a plurality of available advertisements for the one or more time slots; and
   (c) the processor further adapted for scheduling, based on the at least one keyword and at least one of the bid amounts, the advertisement to be rendered to the at least one user in the one or more time slots by obtaining a selected advertisement for a group of users using a combinatorial algorithm that computes, for all combinations of advertisements i and channels d, a maximum value of $\theta_{id}$ based on the equation:

$$\theta_{id} = \sum_{j:c(j)=d} \max\{v_{ij} - u_j, 0\},$$

where:
   i represents an advertisement,
   j represents a viewer,
   $v_{ij}$ represents the bid that an advertiser places on a given viewer j for a given advertisement i,
   c(j) represents the channel currently being viewed by viewer j, and
   $u_j$ represents a revenue value of assigning an advertisement to viewer j.

2. The invention of claim 1, further comprising constructing or updating a profile for each user based on the keywords, wherein step (c) is performed based on the profile.

3. The invention of claim 1, wherein the Internet session is a search engine session, and the at least one keyword is a keyword provided to a search engine by the at least one user.

4. The invention of claim 3, wherein the at least one keyword is obtained by inspecting traffic destined for the search engine.

5. The invention of claim 1, wherein the at least one keyword is obtained by inspecting the content of web pages viewed by the at least one user.

6. The invention of claim 1, wherein the scheduling in step (c) is further based on historical data reflecting the viewing habits of the at least one user.

7. The invention of claim 1, wherein the scheduling in step (c) is performed so that the scheduling maximizes bid revenue.

8. The invention of claim 1, wherein the scheduling in step (c) is performed by obtaining a selected advertisement a(j) for each user based on the equation $$a(j) = \arg\max_{1 \le i \le m} v_{ij},$$

where:
- m represents the total number of advertisements,
- i represents an advertisement,
- j represents a viewer, and
- $v_{ij}$ represents the bid that an advertiser places on a given viewer j for a given advertisement i.

9. The invention of claim 1, wherein the scheduling in step (c) further comprises:
   (c1) constructing a bipartite graph having two columns of nodes, with one column of nodes corresponding to each of the time slots and the other column of nodes corresponding to each of the advertisements; and
   (c2) computing a maximum-weight matching of the bipartite graph.

10. The invention of claim 9, wherein the scheduling in step (c) further comprises, if the numbers of time slots and advertisements are unequal, adding dummy nodes to the bipartite graph to equalize the numbers of nodes in each column.

11. The invention of claim 1, wherein the scheduling in step (c) further comprises computing an expected revenue for each combination of advertisement and time slot, wherein the maximum-weight matching is performed based on the computed expected revenue.

12. The invention of claim 1, wherein the scheduling in step (c) is performed so that an advertisement is scheduled only if the user is already receiving content when the time slot arrives.

13. The invention of claim 1, wherein the packet-based media programming is a digital television system.

14. A system for scheduling an advertisement for rendering in one or more time slots in packet-based media programming, the system comprising:
   a computer connected to the Internet; and
   a processor adapted to:
      (a) obtain at least one keyword from one or more Internet sessions on the computer corresponding to at least one user;
      (b) receive a plurality of bid amounts corresponding to a plurality of available advertisements for the one or more time slots; and
      (c) schedule, based on the at least one keyword and at least one of the bid amounts, the advertisement to be rendered to the at least one user in the one or more time slots,
   wherein the processor is further adapted to schedule by obtaining a selected advertisement for a group of users using a combinatorial algorithm that computes, for all combinations of advertisements i and channels d, a maximum value of $\theta_{id}$ based on the equation:

$$\theta_{id} = \sum_{j:c(j)=d} \max\{v_{ij} - u_j, 0\},$$

where:
- i represents an advertisement,
- j represents a viewer,
- $v_{ij}$ represents the bid that an advertiser places on a given viewer j for a given advertisement i,
- c(j) represents the channel currently being viewed by viewer j, and $u_j$ represents a revenue value of assigning an advertisement to viewer j.

15. The invention of claim 14, wherein the processor is further adapted to construct or update a profile for each user based on the keywords, wherein the scheduling is performed based on the profile.

16. The invention of claim 14, wherein the Internet session is a search engine session, and the at least one keyword is a keyword provided to a search engine by the at least one user.

17. The invention of claim 16, wherein the at least one keyword is obtained by inspecting traffic destined for the search engine.

18. The invention of claim 14, wherein the at least one keyword is obtained by inspecting the content of web pages viewed by the at least one user.

19. The invention of claim 14, wherein the processor is further adapted to schedule based on historical data reflecting the viewing habits of the at least one user.

20. The invention of claim 14, wherein the processor is further adapted to schedule so that the scheduling maximizes bid revenue.

21. The invention of claim 14, wherein the processor is further adapted to schedule by obtaining a selected advertisement a(j) for each user based on the equation $$a(j) = \arg\max_{1 \le i \le m} v_{ij},$$

where:
- in represents the total number of advertisements,
- i represents an advertisement,
- j represents a viewer, and
- $v_{ij}$ represents the bid that an advertiser places on a given viewer j for a given advertisement i.

22. The invention of claim 14, wherein the processor is further adapted to schedule by:
   (c1) constructing a bipartite graph having two columns of nodes, with one column of nodes corresponding to each of the time slots and the other column of nodes corresponding to each of the advertisements; and
   (c2) computing a maximum-weight matching of the bipartite graph.

23. The invention of claim 22, wherein the processor is further adapted to schedule by, if the numbers of time slots and advertisements are unequal, adding dummy nodes to the bipartite graph to equalize the numbers of nodes in each column.

24. The invention of claim 22, wherein the processor is further adapted to schedule by computing an expected revenue for each combination of advertisement and time slot, wherein the maximum-weight matching is performed based on the computed expected revenue.

25. The invention of claim 14, wherein the processor is further adapted to schedule so that an advertisement is scheduled only if the user is already receiving content when the time slot arrives.

26. The invention of claim 14, wherein the packet-based media programming is a digital television system.

* * * * *